No. 750,462. PATENTED JAN. 26, 1904.
B. H. KELLOGG.
DRAFT LIGHTENER.
APPLICATION FILED NOV. 23, 1903.
NO MODEL. 2 SHEETS—SHEET 1.
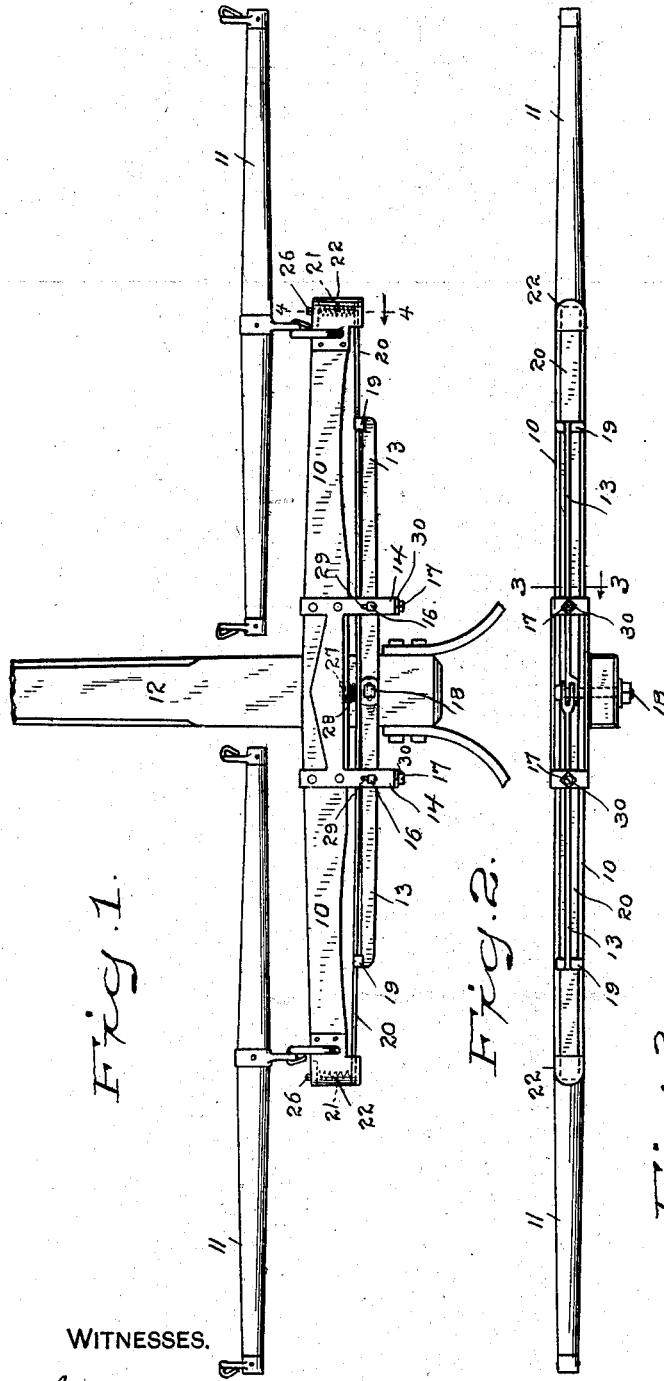
WITNESSES.
H. A. Lamb.
S. W. Atherton.
INVENTOR.
Benjamin H. Kellogg
By A. M. Wooster
Atty.

No. 750,462. PATENTED JAN. 26, 1904.
B. H. KELLOGG.
DRAFT LIGHTENER.
APPLICATION FILED NOV. 23, 1903.
NO MODEL. 2 SHEETS—SHEET 2.
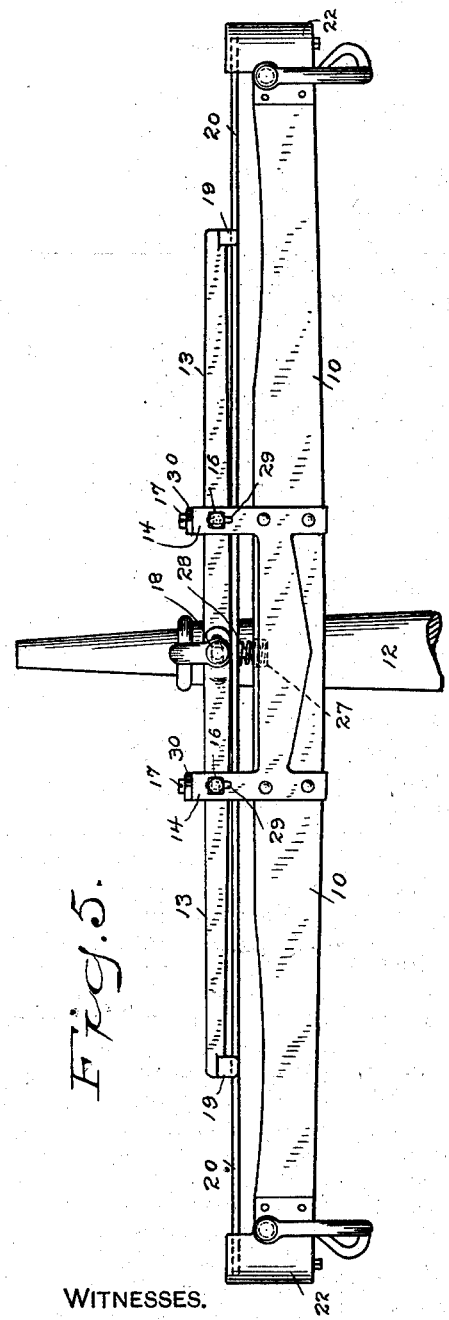
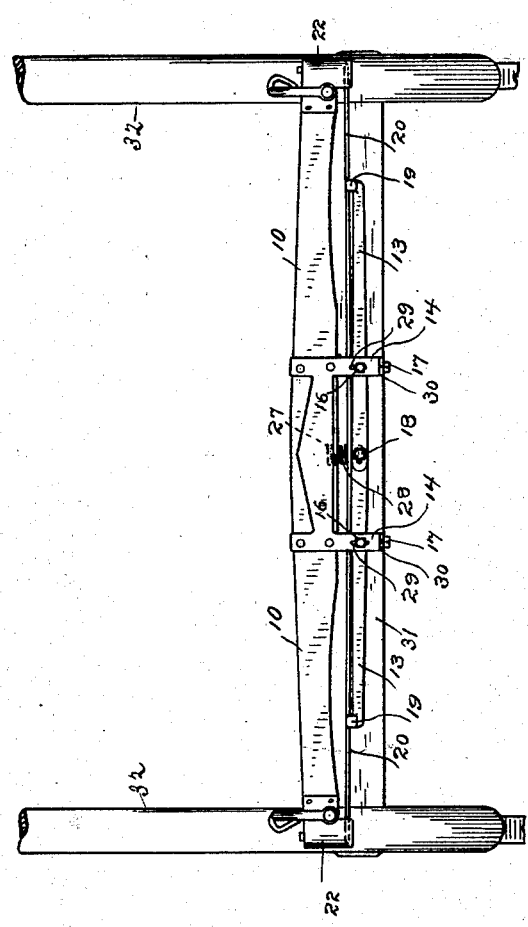
WITNESSES. INVENTOR.
H. A. Lamb. Benjamin H. Kellogg
S. W. Atherton. By A. W. Wooster
Atty.

No. 750,462. Patented January 26, 1904.

UNITED STATES PATENT OFFICE.

BENJAMIN H. KELLOGG, OF SHERMAN, CONNECTICUT.

DRAFT-LIGHTENER.

SPECIFICATION forming part of Letters Patent No. 750,462, dated January 26, 1904.

Application filed November 23, 1903. Serial No. 182,280. (No model.)

*To all whom it may concern:*

Be it known that I, BENJAMIN H. KELLOGG, a citizen of the United States, residing at Sherman, county of Fairfield, State of Connecticut, have invented a new and useful Draft-Lightener, of which the following is a specification.

My invention has for its object to produce a structure adapted for use in connection with an evener, a whiffletree, or a neck-yoke upon vehicles drawn by animals for the purpose of lightening the draft—*i. e.*, making a load not only easier to start, but easier to draw—it being essential in a structure of this character that it be relatively inexpensive to produce, strong enough to insure freedom from breakage under the ordinary and even extraordinary conditions of use, and so simple in construction as to be in no danger of getting out of repair.

In order to accomplish the desired results, I have devised the novel draft-lightener of which the following description, in connection with the accompanying drawings, is a specification, reference characters being used to indicate the several parts.

Figure 1 is a plan view illustrating the application of the invention in connection with an evener—that is, its use in a structure for connecting two draft-animals to a vehicle; Fig. 2, a rear elevation corresponding therewith; Fig. 3, a sectional view, on a greatly enlarged scale, on the line 3 3 in Fig. 2; Fig. 4, a section on the same scale on the line 4 4 in Fig. 1; Fig. 5, a plan view illustrating the application of the invention in connection with a neck-yoke; and Fig. 6 is a similar view illustrating its application in connection with a whiffletree—that is, its use in a structure for connecting a single draft-animal to a vehicle.

10 denotes an element which for convenience I term a "draw-bar," its operation being the same whether it serves as an evener, a neck-yoke, or a whiffletree. In Figs. 1 and 2 this draw-bar serves as an evener. Whiffletrees 11 are connected thereto in the usual or in any preferred manner.

12 denotes a wagon-pole, to which the draw-bar is connected in the manner which I will now describe. 13 denotes levers pivoted upon fulcrums 14, extending rearwardly from the draw-bar. The construction of these fulcrums is of course not of the essence of the invention. In the drawings I have shown the fulcrums as made in the form of yokes bolted to the draw-bar and inclosing hubs 15 on the levers. (See Fig. 3.)

16 denotes pivot-bolts which pass through the hubs on the levers and through slots 29 in the opposite sides of the fulcrum.

17 denotes screw-bolts in the fulcrums, the inner ends of which engage the hubs of the levers and provide a simple and effective draft-equalizer should one of a pair of animals be a better puller than the other. Under ordinary conditions the two screw-bolts are adjusted alike—that is, turned in the same distance. The work to be done will then be divided evenly between two draft-animals. Should one animal be much weaker than the other, however, or should it be desired for any reason to give to it a smaller share of the work to be done the screw-bolt on that side will be turned inward, so as to move the center of oscillation of the corresponding lever forward, the other screw-bolt being either left alone or turned backward, as may be required, depending upon the difference in the amount of work required from the two animals. Having adjusted the two screw-bolts to produce the desired results, they are locked in place by set-nuts 30. The short arms of the levers extend inward and the long arms outward from the fulcrums, the inner ends of both levers being pivoted on a heavy bolt 18, which passes through the pole and is the sole means of connection of the draw-bar to the pole. The ends of the long arms of the levers are provided with clips 19, which partly inclose and bear against a flat spring 20, lying at the rear of the draw-bar and whose ends bear against coil-springs 21 in boxes 22 at the ends of the draw-bar. (See Fig. 4.) The ends of the flat spring are provided with pins 23, which support one end of the coil-springs, the other end of said coil-springs inclosing threaded rods 24, which pass through plates 25 in the boxes. These plates are held against rotation, and the rods are provided with hubs 26, by means of which they may be rotated to move the plates in and out for the purpose of adjusting the tension of the springs. In the rear face of the draw-bar at the center is a socket 27, in which is secured one end of a coil-spring 28, said spring extending outward and its other end bearing against the inner ends of the levers at their pivotal point on bolt 18. The relative strength of the springs may vary greatly, depending upon the conditions of use to which the structure is intended to be applied. In practice I ordinarily give to the center coil-spring 28 approximately half the strength of the end coil-springs 21 and give to flat spring 20 a strength that will cause it to yield intermediate springs 28 and 21—that is to say, as power is applied center coil-spring 28 will yield first, then as power increases flat spring 20 will yield, and last of all under a still greater exercise of power the end springs 21 will yield. If a greater tension of the end springs is required, it may be secured by adjustment, as already explained. In use the levers are in constant vibration through the yielding of the center coil-spring and the flat spring, the end coil-springs only yielding to an appreciable extent in starting or when the resistance is greatly increased. The relative length of the arms of the levers and the point of engagement of the ends of the long levers with the flat spring are likewise matters susceptible of great variation, depending upon the conditions of use, so that they must to a certain extent be left to the judgment of the manufacturer. Under ordinary conditions, however, I make the long and the short arms of the levers to bear approximately the relation to each other of two to one—that is to say, the fulcrums are located approximately one-third the distance from the pivoted inner ends of the levers to the points of engagement of the outer ends thereof with the flat springs. The points of engagement of the long arms of the levers with the flat spring are nearer to the end coil-springs than to the center coil-spring—for example, they may be one-third the distance, more or less, from the bearing-points of said flat spring on the end coil-springs to the bearing-point on the center coil-spring.

In Fig. 5 the draw-bar is applied at the outer end of a wagon-pole instead of at the inner end and serves as a neck-yoke instead of an evener.

In Fig. 6 the draw-bar serves as a whiffletree to which a single draft-animal may be attached. The draw-bar or whiffletree in this form is pivoted in the usual manner to the cross-bar 31, between the thills 32 of a single wagon.

Having thus described my invention, I claim—

1. A draft-lightener comprising a draw-bar having fulcrums on opposite sides of the center, levers engaging said fulcrums whose short arms have a common fixed pivot, a flat spring lying between the levers and the draw-bar, a central coil-spring intermediate the flat spring and the draw-bar and coil-springs intermediate the ends of the flat spring and the draw-bar, the long arms of the levers engaging the flat spring intermediate the center spring and the end springs.

2. A draft-lightener comprising a draw-bar having fulcrums on opposite sides of the center, levers engaging said fulcrums, a fixed bolt on which the short arms of the levers are pivoted, a flat spring lying between the levers and the draw-bar and engaged by the long arms of the levers, a central coil-spring intermediate the flat spring and the draw-bar and coil-springs intermediate the ends of the flat spring and the draw-bar.

3. A draft-lightener comprising a draw-bar provided with fulcrums, levers engaging said fulcrums, a fixed bolt on which the short arms of the levers are pivoted and which connects the draw-bar to the resistance, a flat spring lying between the levers and the draw-bar and engaged by the long arms of the levers, a central coil-spring intermediate the flat spring and the draw-bar and coil-springs intermediate the ends of the flat spring and the draw-bar.

4. A draft-lightener comprising a draw-bar provided with fulcrums, levers engaging said fulcrums, a fixed bolt to which the short arms of the levers are pivoted, a flat spring lying between the levers and the draw-bar and engaged by the long arms of the levers, a relatively weak coil-spring intermediate the center of the flat spring and the draw-bar, and relatively strong coil-springs intermediate the ends of the flat spring and the draw-bar.

5. A draft-lightener comprising a draw-bar provided with fulcrums, levers engaging said fulcrums, a fixed bolt on which the short arms of the levers are pivoted, a flat spring lying between the levers and the draw-bar, a central coil-spring intermediate the flat spring and the draw-bar, and stronger coil-springs intermediate the ends of the flat spring and the draw-bar, the long arms of the levers engaging the flat spring at points nearer to the end coil-springs than to the center coil-spring.

6. A draft-lightener comprising a draw-bar provided with slotted fulcrums, levers having hubs, pivot-bolts passing through the hubs and engaging the slots in the fulcrums, screw-bolts engaging the fulcrums and bearing against the hubs, a flat spring lying between the levers and the draw-bar, the long arms of the levers engaging the flat spring and the short arms being pivoted to each other and to the resistance, a central coil-spring intermediate the flat spring and the draw-bar and stronger coil-springs intermediate the ends of the flat spring and the draw-bar, the parts being so combined and arranged that adjustment of the screw-bolts may be made to equalize uneven pulling by draft-animals.

7. A draft-lightener comprising a draw-bar, yoke-shaped fulcrums rigidly secured thereto and provided with slots in their opposite sides, levers having hubs lying within the fulcrums, pivot-bolts passing through the hubs and engaging the slots, screw-bolts engaging the fulcrums and bearing against the hubs whereby the levers may be adjusted for the purpose set forth, a flat spring lying between the levers and the draw-bar, the long arms of said levers engaging the flat spring and the short arms being pivoted together and to the resistance, a central coil-spring intermediate the flat spring and the draw-bar and stronger coil-springs intermediate the ends of the flat spring and the draw-bar.

8. A draft-lightener comprising a draw-bar provided with fulcrums, levers engaging said fulcrums, a flat spring lying between the levers and the draw-bar, the long arms of said levers engaging the flat spring and the short arms being pivoted together and to the resistance, a central coil-spring intermediate the flat spring and the draw-bar, stronger coil-springs intermediate the ends of the flat spring and the draw-bar and means for adjusting the tension of the stronger coil-springs.

9. A draft-lightener comprising a draw-bar provided with fulcrums on opposite sides of the center and at its ends with boxes, coil-springs in said boxes, a flat spring whose ends lie in said boxes and rest upon the coil-springs, levers engaging the fulcrums whose short arms are pivoted together and to the resistance and whose long arms are provided with clips which engage the flat spring, a central coil-spring intermediate the flat spring and the draw-bar and movable plates in the boxes for adjusting the tension of the end coil-springs.

In testimony whereof I affix my signature in presence of two witnesses.

BENJAMIN H. KELLOGG.

Witnesses:
JAMES H. STUART,
WM. B. HAWLEY.